(12) United States Patent
Buehler et al.

(10) Patent No.: US 11,516,298 B2
(45) Date of Patent: Nov. 29, 2022

(54) INTEGRATING A PLURALITY OF THIRD PARTY SERVICE INTERACTIONS INTO A PORTAL SYSTEM

(71) Applicant: International Business Machines Corporation, Armonk, NY (US)

(72) Inventors: Dieter Buehler, Tuebingen (DE); Marco Berger, Boeblingen (DE); Matthias Falkenberg, Stuttgart (DE); Peter Fischer, Marktrodach (DE); Richard Jacob, Filderstadt (DE); Simon Kirchmann, Stuttgart (DE); Stephan Laertz, Herrenberg (DE); Thomas Steinheber, Stuttgart (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 450 days.

(21) Appl. No.: 16/672,492

(22) Filed: Nov. 3, 2019

(65) Prior Publication Data

US 2020/0068039 A1 Feb. 27, 2020

Related U.S. Application Data

(63) Continuation of application No. 14/558,372, filed on Dec. 2, 2014, now Pat. No. 10,469,612.

(30) Foreign Application Priority Data

Jan. 16, 2014 (GB) ..................................... 1400697

(51) Int. Cl.
*G06F 16/00* (2019.01)
*H04L 67/30* (2022.01)
(Continued)

(52) U.S. Cl.
CPC .............. *H04L 67/30* (2013.01); *G06F 16/25* (2019.01); *G06F 16/258* (2019.01); *G06F 16/83* (2019.01);
(Continued)

(58) Field of Classification Search
None
See application file for complete search history.

(56) References Cited

U.S. PATENT DOCUMENTS

| 7,698,407 B2 | 4/2010 | Mattox, Jr. |
| 8,464,206 B2 | 6/2013 | Jenkins |

(Continued)

FOREIGN PATENT DOCUMENTS

| GB | 2522206 A | 3/2014 |
| WO | 2011034414 A1 | 3/2011 |
| WO | 2013100974 A1 | 7/2013 |

OTHER PUBLICATIONS

IBM: List of IBM Patents or Patent Applications Treated as Related, 2 pg.

(Continued)

*Primary Examiner* — Thu Nguyet T Le
(74) *Attorney, Agent, or Firm* — Cuenot, Forsythe & Kim, LLC

(57) ABSTRACT

Integrating a plurality of third party service interactions into a portal including a Web content management system includes receiving a data structure, associating the data structure with a selected profile out of a plurality of profiles based on the origin of the data structure, and transforming content of the received data structure, using a declarative mapping associated with the selected profile, into an intermediate data structure. The intermediate data structure may be provided to a presentation layer of the portal. A signal causing a rendering of the intermediate data structure may (Continued)

be triggered via a portlet of the portal to a display. Captured input from the portlet from the intermediate data structure may be transformed to the data structure using the declarative mapping associated with the selected profile. The data structure may be sent.

15 Claims, 8 Drawing Sheets

(51) Int. Cl.
  *G06F 16/83* (2019.01)
  *G06F 16/25* (2019.01)
  *G06F 16/84* (2019.01)
  *G06F 16/958* (2019.01)
  *H04L 67/53* (2022.01)

(52) U.S. Cl.
  CPC ............ *G06F 16/84* (2019.01); *G06F 16/972* (2019.01); *H04L 67/53* (2022.05)

(56) References Cited

U.S. PATENT DOCUMENTS

| | | | |
|---|---|---|---|
| 10,469,612 B2 | 11/2019 | Buehler et al. | |
| 2003/0065558 A1 | 4/2003 | Shaw | |
| 2003/0149934 A1* | 8/2003 | Worden | G06F 16/252 715/239 |
| 2008/0091634 A1 | 4/2008 | Seeman | |
| 2008/0306987 A1 | 12/2008 | Chen | |
| 2009/0150367 A1 | 6/2009 | Melnik | |
| 2009/0150856 A1 | 6/2009 | Elaasar | |
| 2009/0228678 A1 | 9/2009 | Takano | |
| 2010/0162095 A1* | 6/2010 | Tsujii | G06F 16/958 707/E17.014 |
| 2012/0005187 A1 | 1/2012 | Chavanne | |
| 2012/0192082 A1 | 7/2012 | Bakalov | |
| 2012/0331044 A1 | 12/2012 | Timmons | |
| 2013/0036351 A1 | 2/2013 | King | |
| 2013/0246902 A1 | 9/2013 | Buehler | |
| 2015/0201037 A1 | 7/2015 | Buehler | |
| 2015/0242503 A1 | 8/2015 | Buehler | |
| 2015/0242528 A1 | 8/2015 | Buehler | |

OTHER PUBLICATIONS

Buehler, D. et al., "Integrating a Plurality of Third Party Service Interactions Into a Portal System", U.S. Appl. No. 14/558,372, filed Dec. 2, 2014, 38 pages.

Priya, V. S. et al., "An Implementation Of Web Personalization Using Web Mining Techniques," International Journal of Computer Science and Mobile Computing, vol. 2, No. 6, pp. 145-150, Jun. 2013, retrieved from the Internet: <http://www.ijcsmc.com/docs/papers/June2013/V2I6201337.pdf>.

"Method and System for Integrating Non-Portal Interactive Web Applications with a Portal System," [online] IP.com Prior Art Database, Disclosure No. IPCOM000230803D, Sep. 12, 2013, retrieved from the Internet: <https://priorart.ip.com/IPCOM/000230803>, 1 pg.

"Method to Dynamically Generate Personalized Web Content from Pre-existing Artifacts," [online] IP.com Prior Art Database, Disclosure No. IPCOM000176141D, Nov. 6, 2008, retrieved from the Internet: <https://priorart.ip.com/000176141>, 1 pg.

"Dynamic Definition of Portal Pages Based on End-User Interactions," [online] IP.com Prior Art Database, Disclosure No. IPCOM000022357D, Mar. 10, 2004, retrieved from the Internet: <https://priorart.ip.com/IPCOM/000022357>, 1 pg.

Chang, C.C. et al., "Application Of Neural Networks And Kano's Method To Content Recommendation In Web Personalization," [online] Expert Systems with Applications, vol. 36, No. 3, Part 1, Apr. 2009, pp. 5310-5316, retrieved from the Internet: <http://www.sciencedirect.com/science/article/pii/S0957417408003849>, 2 pg.

"System and Method for Sharing Portal Pages Aggregated on End Users' Computers," [online] IP.com Prior Art Database, Disclosure No. IPCOM000130008D, Oct. 10, 2005, retrieved from the Internet: <https://priorart.ip.com/000130008>, 2 pg.

* cited by examiner

200

```
atom.Name=ibm.portal.atom
atom.extends=ibm.portal.xml.common
atom.type=xpath
atom.BeanListProviderID=ibm.portal.plr.xml
atom.ResourceBundleBaseName=com.ibm.workplace.wcm.pzn.xml.\
      AtomBeanListProvider
atom.NamespaceMapping.atom=http://www.w3.org/2005/Atom
atom.ListItemSelection=//atom:entry
atom.ItemAttribute.id=./atom:id
atom.ItemAttribute.title=./atom:title
atom.ItemAttribute.summary=./atom:summary
atom.ItemAttribute.subtitle=./atom:subtitle
atom.ItemAttribute.authorName=./atom:author/atom:name
atom.ItemAttribute.authorEmail=./atom:author/atom:email
atom.ItemAttribute.authorUri=./atom:author/atom:uri
atom.ItemAttribute.contributorName=./atom:contributor/atom:name
atom.ItemAttribute.contributorEmail=./atom:contributor/atom:email
atom.ItemAttribute.contributorUri=./atom:contributor/atom:uri
atom.ItemAttribute.updated=./atom:updated
atom.ItemAttribute.updated.Type=Date
atom.ItemAttribute.published=./atom:published
atom.ItemAttribute.published.Type=Date
# definition of an associated attribute which references
# an xpath relative to data that is available under a link defined
atom.ItemAttribute.associatedDataLink=./atom:link[@rel='details']/@href
atom.AssociatedItemAttribute.detailedInfo={associatedDataLink}//path/to/data
# definition of an associated profile
# this means that all furter data will be available under the key
# <Prefix>.<AssociatedProfileKey> - in this case details.detailedAdress
# if a ItemAttribute.detailedAdress is defined in the associated profile
atom.AssociatedProfile.Prefix=details
atom.AssociatedProfile.Name=ibm.portal.xml.details
atom.AssociatedProfile.Link=./atom:link[@rel='details']/@href
# definition of an computed attribute which references
atom.ComputedItemAttribute.associatedDataLink={defaultComputedProvider}
```

FIG. 2

INTEGRATING A PLURALITY OF THIRD PARTY SERVICE INTERACTIONS INTO A PORTAL SYSTEM

CROSS-REFERENCE TO RELATED APPLICATIONS

This application claims the benefit of United Kingdom Application Number 1400697.7 filed on Jan. 16, 2014, which is fully incorporated herein by reference.

BACKGROUND

Web portals (Web normally refers here to the World Wide Web) allow users to have a role specific personalized view on your enterprise's application and Web content to your end users via a single entry point. Applications and information coming from multiple sources are aggregated into a portal page that serves a specific business need helping site visitors, customers or employees to get to their individual goals more efficiently. This could mean, e.g., for an employee to get the individual job tasks done more quickly and make faster and better decisions because all relevant information and applications are immediately at hand on the corresponding portal page, or for a site visitor to find targeted information and applications for her or his specific user profile.

In those portal systems, the portal page is typically assembled by page editors putting the right set of application components (typically portlets) and the right set of accompanying Web content onto those pages and then exposing those pages to individual user roles, as needed. The Web content in turn, is typically created by content authors using a Web content management system (WCMS) that provides the means to efficiently create Web content supporting concepts like workflow based approval processes for new content, previewing of new draft content, versioning and re-usable design components to support a consistent look and feel, targeting of the right content to the right user profiles, archiving and syndicating newly created or modified content from an authoring system to individual delivery systems.

On the other hand one trend of the current era is the integration capabilities that are offered by any kind of Web system. This may include systems in the field of Enterprise Resource Planning (ERP), Customer Relationship Management (CRM), Business Intelligence, Analytics (BI or BA) or e-Commerce. These kinds of services will more and more become available in the cloud and thus provide potential for effective integration scenarios. This is especially meaningful in order to avoid media discontinuity by switching from one cloud offering, i.e., from one Web page to the next, and thus lacking operational efficiency.

Thus integrating a portal with any service that is available in the Web is extremely attractive as it allows for displaying and interacting with said services in the context of displayed related information on one Web site and thus has the interaction with said services available at the end-user's fingertips.

In prior art, these kinds of integration scenarios are typically realized by dedicated pieces of integration code. On the one hand side, this could be realized as specialized portlet application accessing remote services and generating the markup that is to be added as a fragment of an overall portal page. On the other hand, it could be accomplished via already defined extension points of a pluggable architecture which upfront define the information that is to be served by those code fragments that will be plugged into said pluggable architecture.

A typical prior art integration between Web portal and external Web sites may be based on a portal comprising a page model, a portlet model and a Web content management system (WCMS). A page editor, a portlet developer, a content author and a site designer are required to collaborate in the development of such an integration in order to interact with an external Web site in a desktop computer browser, a tablet computer browser or a mobile phone browser. Thus, a huge effort is required to make it work.

One of the limitations of prior art solutions is the fact that a mapping between the data structure format returned by the remote Web sites can either not be controlled at all or is controlled in application code for which further programming skills are needed. Furthermore, prior art solutions do not foresee extendibility and adjustability to new or evolving remote data structures and are rather static in nature.

The other drawback with existing solutions is the fact that they are rather aimed at a READING use case. As more and more remote services will become available in the cloud—including write operations such as creation and update of data structures—the existing integration patterns lack completeness in the integration use cases that may be covered.

As a consequence, integrating new remote services, feeds and data structures come with big complexity as sophisticated programming skills are required. Furthermore, extending the integrated data or adjusting to evolving data structures always comes with excessive implementation and testing cycles as this usually means working at the core of the integration logic. Organizations face these restrictions in a way that either their IT department lacks respective programming skills or that only very restricted time frames are available for deploying new integration logic into the system. Interaction services, as the aforementioned, are usually tightly controlled by the application logic that is actually performing an interaction due to the fact that there is no generalized pattern on how to interact with these kinds of services.

The lack of adaptability is less of a problem on sites where the focus lies clearly on one use case and the integration is only focusing on few services and nothing further.

A portal page and experience, however, may be comprised of various components among which are portlets as well as Web content created by Web content author(s). The visitor's expectation is to integrate information and capabilities of such third party provided services like CRM, ERP, BI, Analytics available on the portal page nicely fitted into the existing portal page from a look and feel perspective as well as from an interaction perspective which means that full use cases are available on that page and the user is not restricted to viewing information from remote systems only, but as soon as interaction is necessary needs to navigate to the native user interface (UI) of the remote system.

Hence, there is a need, for a more effective integration of different interactive services from outside service provider Web sites. Ideally, no additional programming requirement may be necessary if a new type of interactive service may be called by a portal which may have an unknown interaction style.

SUMMARY

A method for integrating a plurality of third party service interactions into a portal including a Web content management system includes receiving a data structure, associating the data structure with a selected profile out of a plurality of profiles based on the origin of the data structure, and transforming content of the received data structure, using a declarative mapping associated with the selected profile, into an intermediate data structure. The method may also include providing the intermediate data structure to a presentation layer of the portal, triggering a signal causing a rendering of the intermediate data structure via a portlet of the portal to a display, and transforming captured input from the portlet from the intermediate data structure to the data structure using the declarative mapping associated with the selected profile. The method further may include sending the data structure.

A system for integrating a plurality of third party service interactions into a portal including a Web content management system includes a processor programmed to initiate executable operations. The executable operations include receiving a data structure, associating the data structure with a selected profile out of a plurality of profiles based on the origin of the data structure, and transforming content of the received data structure, using a declarative mapping associated with the selected profile, into an intermediate data structure. The executable operations further include providing the intermediate data structure to a presentation layer of the portal, triggering a signal causing a rendering of the intermediate data structure via a portlet of the portal to a display, transforming captured input from the portlet from the intermediate data structure to the data structure using the declarative mapping associated with the selected profile, and sending the data structure.

A computer program product includes a computer readable storage medium having program code stored thereon. The program code is executable by a processor to perform a method. The method includes receiving a data structure, associating the data structure with a selected profile out of a plurality of profiles based on the origin of the data structure, and transforming content of the received data structure, using a declarative mapping associated with the selected profile, into an intermediate data structure. The method also includes providing the intermediate data structure to a presentation layer of the portal, triggering a signal causing a rendering of the intermediate data structure via a portlet of the portal to a display, transforming captured input from the portlet from the intermediate data structure to the data structure using the declarative mapping associated with the selected profile, and sending the data structure.

BRIEF DESCRIPTION OF THE DRAWINGS

Preferred embodiments of the invention will now be described, by way of example only, and with reference to the following drawings:

FIG. 2 shows an embodiment of a declarative mapping.

DETAILED DESCRIPTION

Figure 1:
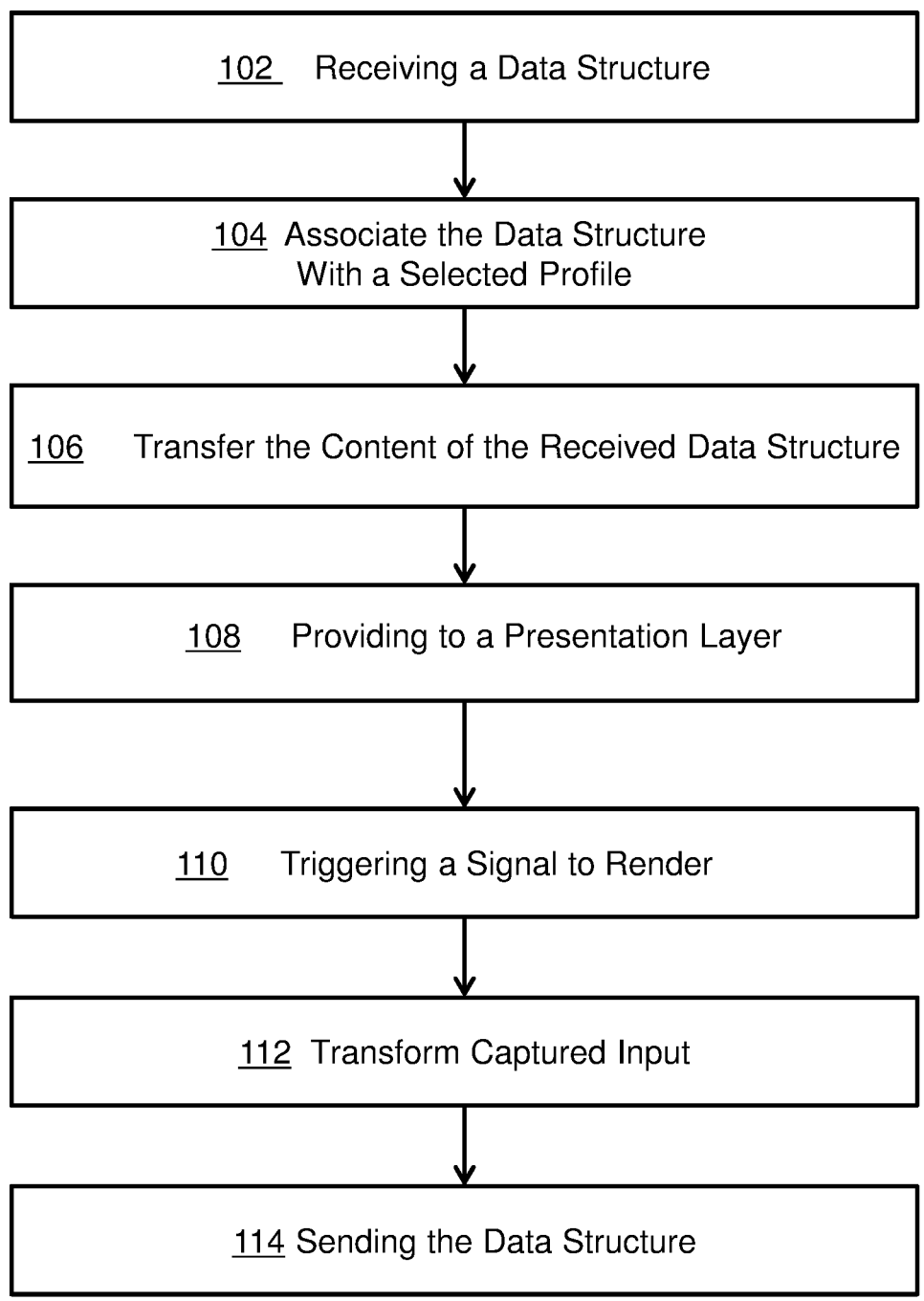
FIG. 1 shows flowchart of the inventive method for integrating a plurality of third party service interactions into a portal system.

The embodiments of the invention relate generally to a method for integrating a plurality of third party service interactions into a portal system. The embodiments of the invention relate further to a related portal system, a computing system, a data processing program, and a computer program product.

In the context of this description, the following conventions, terms and/or expressions may be used:

The term "third party service interactions" may denote interactions via a user interface operated by a user with services, e.g., cloud services that may be provided by a third party operator. A classic example may be an e-commerce site to which a user may enter personal data or order data.

The term "portal system" or Web portal system may denote a system comprising tools and subsystems to facilitate a display of information coming from diverse sources in a uniform way. Usually, each information source may get its dedicated area on the page for displaying information, called a portlet; often, the user may configure which ones and how the individual portals may be displayed. More complex portal systems also include a WCMS.

The term "Web content management system" (WCMS) may denote a component of a portal system which may allow an effective management of content in the form of, e.g., text, images, sound and/or video files to be displayed as part of a Web site. A portal system may also be designed to receive input from a user.

The term "declarative mapping" may provide means to locate an information item in a data structure received from, e.g., a remote service and map it to a defined attribute name. This would work for a READ (from the external service) case as well as for the WRITE case (to the external service), whereby in the latter, the declarative mapping may point to the location within the data structure to where new values are to be written to. For a given XML data structure, the declarative mapping may map a given attribute name, e.g., 'authorName' to an XPath statement that may locate the respective location in the data structure for read and write purposes.

The term "intermediate data structure" may denote a data structure that may be received from external to the portal system and which may have undergone a transformation into a format which may be a generalized data structure independent of the source of the originally received data structure. The intermediate data structure may be used inside the portal.

The term "presentation layer" may denote a component of a portal system that transforms data within the portal system to be transformed to include a specific layout and styling within the visual part of the portal or a portlet.

The term "portlet" may denote pluggable user interface software components that may be managed and displayed in the Web portal. Portlets may produce fragments of markup (e.g., HTML, XHTML, WML) code that may be aggregated into a portal.

The term "Xpath statement" may denote an instrument to navigate in an XML document (eXtended Markup Language) by path expressions. XPath is also a syntax for defining parts of an XML document. XPath contains a library of standard functions and is a major element in XSLT (eXtended Style Sheet Language Transformation) and is recommended by the World Wide Web Consortium (W3C).

The need for a more effective integration of different interactive services from outside service provider Web sites may be addressed by a method for integrating a plurality of third party service interactions into a portal system, a related portal system for such an integration, a computing system, a data processing program, and a computer program product, according to the independent claims.

According to one aspect, a method for integrating a plurality of third party service interactions into a portal system may be provided. A method may make use of a WCMS. The method may comprise receiving a data structure, associating the data structure with a selected profile out of a plurality of profiles based on the origin of the data structure, and transforming content of the received data structure—using a declarative mapping associated with the selected profile—into an intermediate data structure.

The method may further comprise providing the intermediate data structure to a presentation layer of the portal system, triggering a signal causing a rendering of the intermediate data structure via a portlet of the portal system to a display, and transforming captured input from the portlet from the intermediate data structure to the data structure using the declarative mapping associated with the selected profile. Last but not least, the data structure may be sent.

According to another aspect, a portal system for integrating a plurality of third party service interactions into a portal system may be provided. The portal system may comprise a WCMS. The method may comprise a receiving unit adapted for receiving a data structure, an associating unit adapted to associating the data structure with a selected profile out of a plurality of profiles based on the origin of the data structure, and a first transformation unit adapted for transforming content of the received data structure, using a declarative mapping, associated with the selected profile, into an intermediate data structure.

Furthermore, the portal system may comprise a trigger unit adapted for triggering a signal causing a rendering of the intermediate data structure via a presentation layer to a portlet of the portal system to a display, a second transformation unit adapted for transforming captured input from the portlet from the intermediate data structure to the data structure using the declarative mapping associated with the selected profile, and a sender adapted for sending the data structure; in particular, to the initiating Web site.

It may be noted that the first transformation unit and the second transformation unit may be one transformation unit adapted for performing a transformation in both directions.

The proposed method for integrating a plurality of third party service interactions into a portal system may offer a couple of advantages:

Firstly, the introduced profiles may provide a basis for a declarative mapping for describing the transformation from the external (XML, JSON, CSV) data to a generic intermediate list data structure (called the MappedObjectList) that than may be transformed into a markup data structure using general purpose Web content management design components.

Secondly, the profiles may enumerate the available pieces of meta-data—so called item attributes—available in the individual items in the list. This enumeration may be used by the Web content management user interfaces used by the site designers to make it easy for them to access these data by selecting individual pieces of meta data from drop down boxes instead of having to know the exact item attribute names by heart.

Thirdly, the profiles may allow the achieving of an inverse transformation of the external XML data, to modify that transformed XML data and post the modified data back to the external system. As a result, list rendering profiles may be created for all kinds of different XML based backend systems—third party service provider systems—allowing to not only rendering that data using Web content design components but also rendering interaction UIs (user interfaces) for that data using that same technique all without the need to write or deploy any custom code.

A further benefit of the involved Interaction-Component is that if managed as Web content, the creation and update of those may if desired be managed in the same way as other Web content in the portal system. I.e., managing Interaction-Components may be done using workflow based approval processes, previewing of new draft list definitions and presentations, versioning, leveraging reusable design components (icons, styles, colors . . . managed by the WCMS) to support a consistent look and feel of the portal appearance, targeting of the right social lists to the right user profiles, archiving and syndicating newly created or modified lists definitions and list presentations from an authoring system to individual delivery systems.

According to one embodiment of the method, the received data structure—e.g., from a third party service provider—may not comprise content; instead, an empty data structure may be loaded which may be filled via the intermediate data structure with captured input from the portlet, in particular with input given by a user. This may represent a CREATE case, i.e., an input of a user may be transferred through the portal system to the remote service operated by the third party service provider. In this case, the first transformation from the data structure to the intermediate data structure may be skipped optionally.

According to a further embodiment of the method, the captured input may be used to modify the content of the data structure via the intermediate data structure with captured input from the portlet. This may represent the MODIFY case. Here, a content received by the portal system may be displayed in a portlet and may be modified by the user before it may be transferred back to the sending (cloud) service of the third party provider. It may be mentioned that also a DELETE case may be defined in that content may be deleted within the portlet of the portal system. The intermediate data structure may be empty and the receiving third party service system may interpret such an empty data structure as a delete of the referenced data structure.

According to an enhanced embodiment of the method, the selected profile may be based on XML or JSON syntax. JSON is the abbreviation for JavaScript Object Notation, which is an open standard format that uses human-readable text to transmit data objects consisting of attribute-value pairs. It is used primarily to transmit data between a server and Web application, as an alternative to XML. Although originally derived from the JavaScript scripting language, JSON is a language-independent data format, and code for parsing and generating JSON data is readily available in a large variety of programming languages.

According to a further enhanced embodiment of the method, a new profile may be generated based on content of the selected profile. This may allow inheritance of profiles and may simplify the work of profile designers because existing profile definitions may be re-used.

According to one embodiment of the method, a new profile and/or a profile handler may be loadable from outside of the portal system. Thus, third party service providers may supply a new profile and/or a related profile handle for a new service the third party service provider may offer. The profile and the profile handler may be managed in respective repositories within the portal system. This way, the receivable and automatic transformation of new and before unknown data formats may be manageable within the portal system without any interaction of a programmer with the portal system. All relevant information required to manage the content may be provided by the third party system. Thus, the portal system represents a flexible pluggable architecture.

According to one embodiment of the method, transforming the content of the received data structure may be based on mapping a data field of the received data structure to an Xpath statement which points to a location within the intermediate data structure to where the content of the data field of the received data structure has to be loaded. The intermediate data structure may be XML based. Again, this way a flexible and adaptable portal system is delivered.

According to one embodiment of the method, the portal system may comprise a profile provider registry for storing the profile and selected profile data. As mentioned above, any third party content provider may deliver their own profile building a basis for how the received data structure may be mapped to the intermediate data structure. No additional internal programming within the portal system may be required.

In a similar way—according to one embodiment—the portal system may comprise a profile handler repository for storing the profile handler data. Also the profile handler may be provided by the service offering of third party providers.

According to a sophisticated embodiment of the method, the portal system may comprise a profile inheritance analyzer adapted for analyzing a new profile loadable from outside the portal system for a re-use of an already defined declarative mapping on a profile which may already be stored in the profile provider registry and/or the profile handler repository. In this case, the third party service provider may not have delivered a profile and/or profile handler. The essential mapping may be provided from within the portal system. The programmer may be assisted by the profile inheritance analyzer in that mapping requirement of the newly received data structure which may have similarities with already existing profiles. In this case, a re-use of existing mapping may be actively supported.

According to a further embodiment of the method, the portal system may comprise a profile association analyzer adapted to generate an associated declarative mapping in cases the received data structure is missing data elements. This represents basically a re-use of mappings for similar data structures that are known to one using a known selected profile. It may also reduce the efforts required by a programmer.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for integrating a plurality of third party service interactions into a portal system is given. Afterwards, further embodiments of the related portal system will be described.

FIG. 1 shows a block diagram of an embodiment of the method 100 for integrating a plurality of third party service interactions into a portal 602. The method may comprise a WCMS 604. The method 100 may comprise receiving, 102, a data structure, in particular in XML, JSON, or a self-defined format from a third party service provider which may be the carrier of the interaction with an application of the third party service provider, i.e., an external Web page 616.

The data structure may be associated, 104, with a selected profile 715 out of a plurality of profiles 715 based on the origin 616 of the data structure. This may be based on the called URL (universal resource locator), i.e., the external Web page 616. A specific profile 715 may have been associated with a specific URL beforehand. The content of the received data structure may be transformed, 106, using a declarative mapping associated with the selected profile 715, into an intermediate data structure, in particular expressed in a markup language as a "bean" (in the sense of a Java class, representing a component model), i.e., a list of mapped objects.

The intermediate data structure may be provided, 108, to a presentation layer of the portal 602, and a signal may be triggered, 110, causing a rendering of the intermediate data structure via a portlet 618 of the portal 602 to a display for interaction with a user.

In a reverse direction, captured input from the portlet 618 may be transformed, 112, from the intermediate data structure to the data structure, in particular to the third party data structure using the same declarative mapping associated with the selected profile 715 just in the opposite direction compared to the initial transformation. After that, the data structure may be sent, 114, in particular, to the third party service provider—i.e., external Web page 616—for being used as input for the application of the service provider.

FIG. 2 shows an embodiment 200 of a declarative mapping. A ListRenderingProfile 715, or simply profile 715, may define a mapping description which may be brought into the portal system via ProfileProviders (not shown) which may be registered within a ProfileProviderRegistry 722 (see below). Thus, these profiles 715 may be defined, e.g., by adding configuration information, within the WCMS 604 itself. This implies the added benefit of a full Web content management life cycle or via custom profile providers. The data structures that are provided by third party services are typically served as XML or JSON structures. Thus, ListRenderingProfiles 715 may be of various types such as XML, JSON, CVS and define a mapping between a received data structure and the way the content of the data structure will become accessible for Web content authors within the WCMS 604.

More often than not, remote data may consist of arbitrary representations of lists. As a consequence, a ListRenderingProfile 715 may also define the mapping to said list entries which are referred to as mapped objects. For the sake of completeness, it is also worth mentioning the fact that such lists of length 1 may represent a single mapped object occurrence.

A ListRenderingProfile mapping, e.g., to an XML data structure or intermediate data structure, would define a key value mapping in a way that an attribute name will be mapped to an Xpath statement that points to the location in said XML data structure where the respective content is located as outlined in the following. FIG. 2 shows an embodiment 200 of such a declarative mapping.

Figure 3:
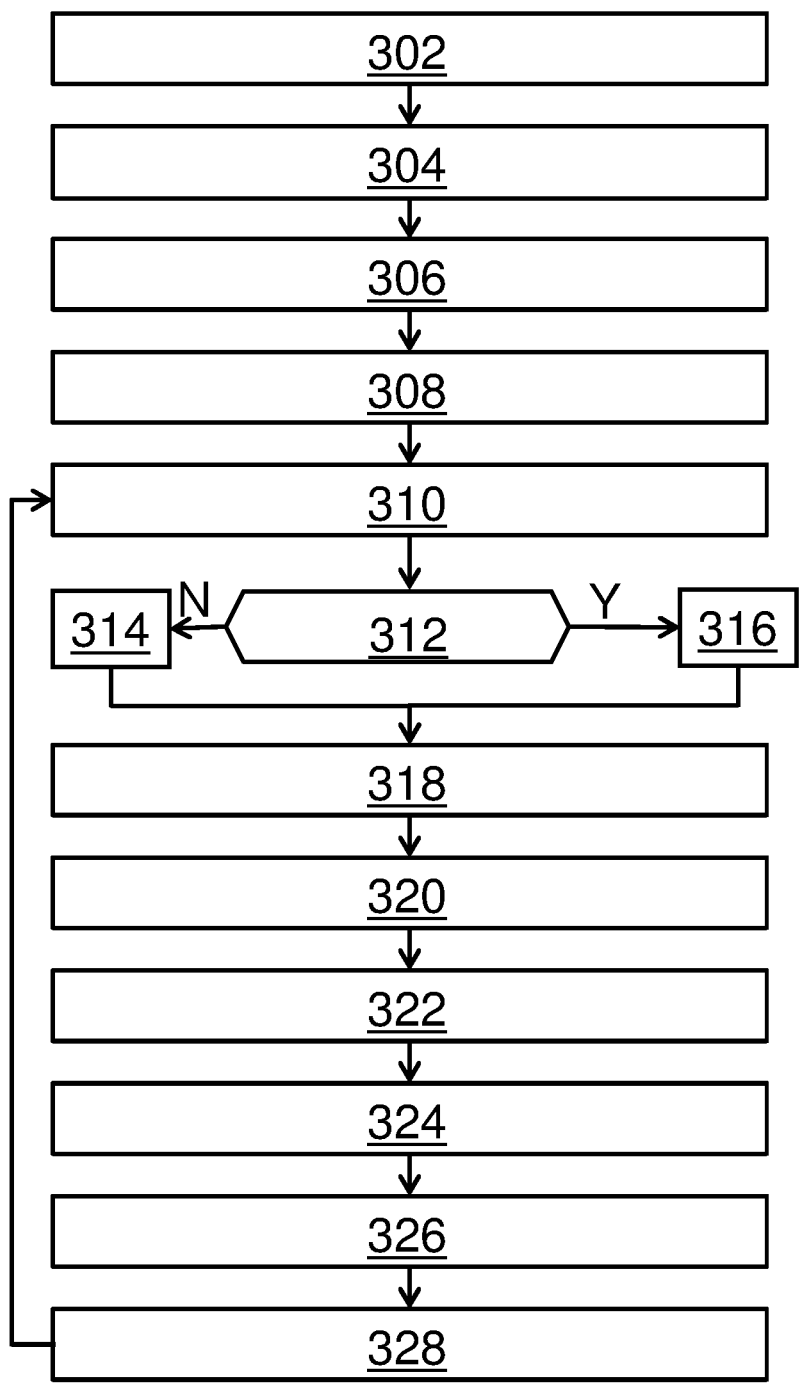
FIG. 3 shows an embodiment of a flowchart for registering of a new profile.

FIG. 3 shows an embodiment 300 of a flowchart for registering of a new profile. Table 1 may allow a step by step mapping of the flowchart elements and its respective meaning:

TABLE 1

| reference numeral | Action |
| --- | --- |
| 302 | A new ProfileProvider extension is plugged. |
| 304 | The MappedObjectProfileManager retrieves all profile providers from the profile provider registry. |
| 306 | The MappedObjectProfileManager requests the provided list of profiles from the plugged profile provider. |
| 308 | The MappedObjectProfileManager parses each provided profile description. |
| 310 | The profile manager loads the new profile entries. |
| 312 | A test is performed: Is the entry a metadata? |
| 314 | In case of "NO": The Profile Manager registers the defined attribute mapping (name and mapping) for the profile at hand. |
| 316 | In case of "YES": The profile manager adds the new metadata into the profile. |
| 318 | The profile manager validates the new profile. |
| 320 | The profile association analyzer resolves and analyzes the associated item attribute reference. |
| 322 | The profile manager resolves the added metadata. |
| 324 | The profile manager finalizes each profile by sorting non lazy computed attributes and list properties. |
| 326 | The profile inheritance analyzer resolves parent profile reference and enriches the profile at hand with inherited profile properties and attribute mappings. |
| 328 | The new ListRenderingProfile is added to the ListRenderingProfile registry. |

Figure 4:
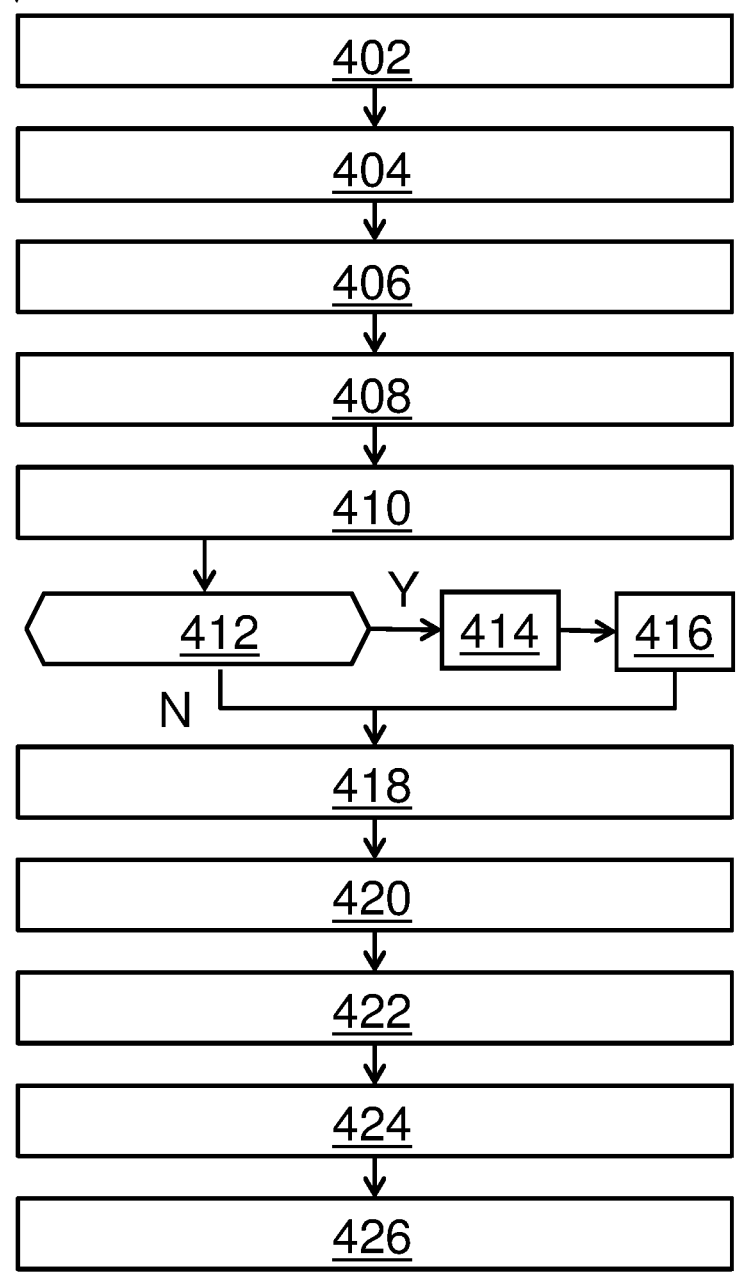
FIG. 4 shows an embodiment of a flowchart rendering of a plugged list.

FIG. 4 shows an embodiment 400 of a flowchart rendering of a plugged list. Table 2 may allow a step by step mapping of the flowchart elements and its respective meaning:

TABLE 2

| Reference numeral | action |
| --- | --- |
| 402 | WCMS portlet starts rendering a given FeedDriven ListDefinition. |
| 404 | The referenced FeedDriven list presentation calls the QueryContextTag and passes the URL to where the remote data resides, the ID of the profile used for mapping data and an optional read transformer ID. |
| 406 | The rendering extension passes ProfileID, dataSourceURL, transformer template ID to the MappedObjectintgrtionSvc. |
| 408 | MappedObjectIntegrationSvc loads the profile from the MappedObjectProfileManager based on ProfileID. |
| 410 | MappedObjectIntegrationSvc queries the remote data from the external Web site as specified in the dataSourceURL. |
| 412 | A test is performed: TransformerID passed by QueryContextTag? |
| 414 | In case of "YES": MappedObjectIntegrationSvc loads the ReaderTransformer. |
| 416 | ReaderTransformer transforms data as specified in transformation template. |
| 418 | In case of "NO" and after 416: The MappedObjectIntegrationSvc loads the profile handler from the ProfileHandlerRegistry based on the ProfileType specified in the profile definition. |
| 420 | The MappedObjectIntegrationSvc passes received/transformed data and the profile on to the loaded profile handler. |
| 422 | The profile handler uses the mappings defined in the profile to read the specified attribute values from the data received from the remote side. |
| 424 | The profile handler generates a list of MappedObjects and passes the list back to the FeedDriven Objects Rendering Extension. |

TABLE 2-continued

| Reference numeral | action |
|---|---|
| 426 | The FeedDriven ListPresentation renders the returned MappedObjects by accessing the mapped attributes within the mapped objects via the AttributeResource Tag. |

This flow may be referred to as READ case.

Figure 5:
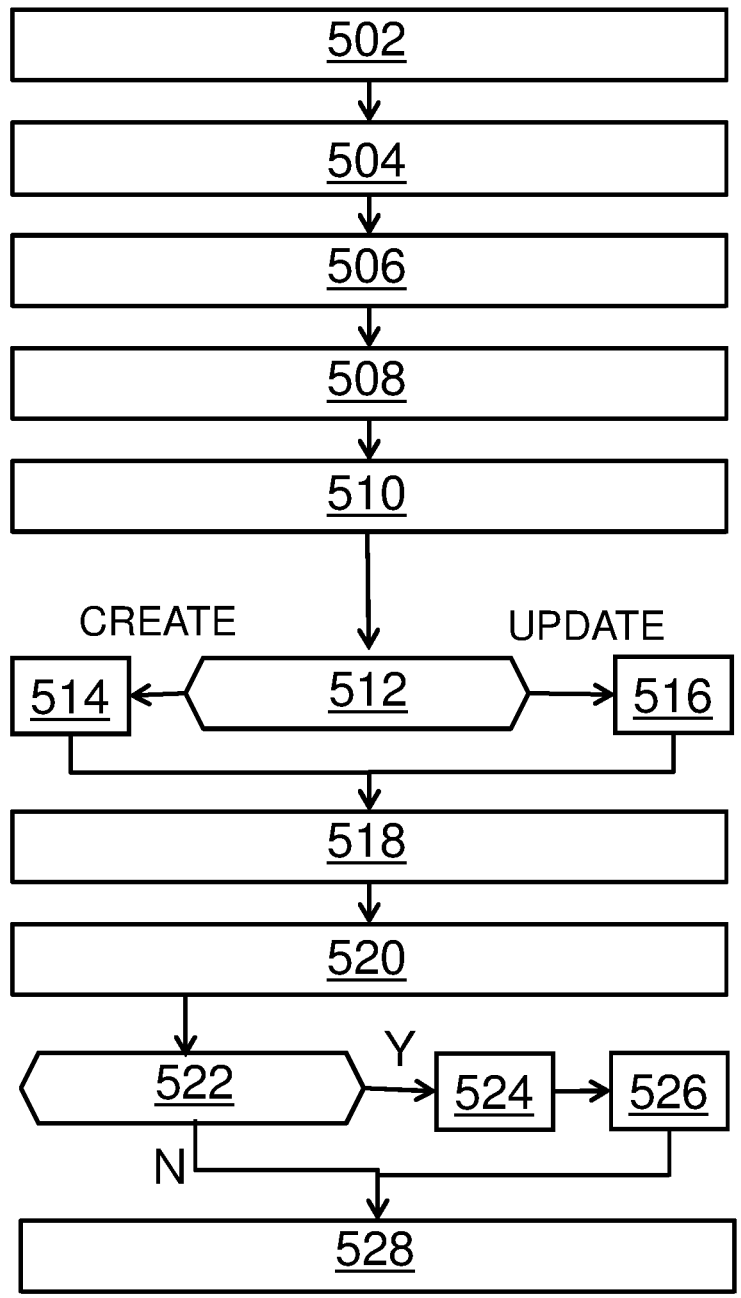
FIG. 5 shows an embodiment of a create/update interaction with a plugged list.

FIG. 5 shows an embodiment 500 of a CREATE/UPDATE interaction with a plugged list. Table 3 may allow a step by step mapping of the flowchart elements and its respective meaning:

TABLE 3

| Reference numeral | Action |
|---|---|
| 502 | The WCM portlet did render an InteractionComponent. |
| 504 | The InteractionComponent references a SetWriteContext tag which is used to establish the write context by passing the URI to the remote data to write to, a ProfileID to locate the mappings for writing, an optional transformer 10 as well as the update type [CREATE|UPDATE]. |
| 506 | An end user triggering the interaction causes the FeedDrivenObjects Rendering extension to pass the profileID, dataSinkURL, templateURL, transformer template ID to the MappedObjectIntgrtionSvc. |
| 508 | The MappedObjectIntegrationSvc loads the profile from the MappedObjectProfileManager based on the ProfileID. |
| 510 | The MappedObjectIntegrationSvc loads the profile handler from the ProfileHandlerRegistry based on the ProfileType specified in the profile definition. |
| 512 | A test is performed: "CREATE or "UPDATE"? |
| 514 | In case of "CREATE": MappedObectIntegration Svc loads the skeleton specified by the templateURI. |
| 516 | In case of "UPDATE": The MappedObjectintegrationSvc loads the remote data to be updated from the external Web site as specified by the templateURL. |
| 518 | The MappedObjectIntegrationSvc passes the created skeleton or remote data to be updated on to the profile handler being loaded. |
| 520 | The profile handler uses the mappings defined in the profile to write/update the specified attribute values in the skeleton/data as defined by the mapping in the profile. |
| 522 | A test is performed: Transformer template ID known? |
| 524 | In case of "YES": The MappedObjectIntegrationSvc loads the WriteTransformer. |
| 526 | The WriterTransformer transforms data as specified in transformation template for later submission to the remote Web site. |
| 528 | In case of "NO" in 522 and after 526: The MappedObjectIntegrationSvc posts the data to be modified/created to the external Web site which results in a CREATE/UPDATE operation being executed in the remote service. |

Figure 6:
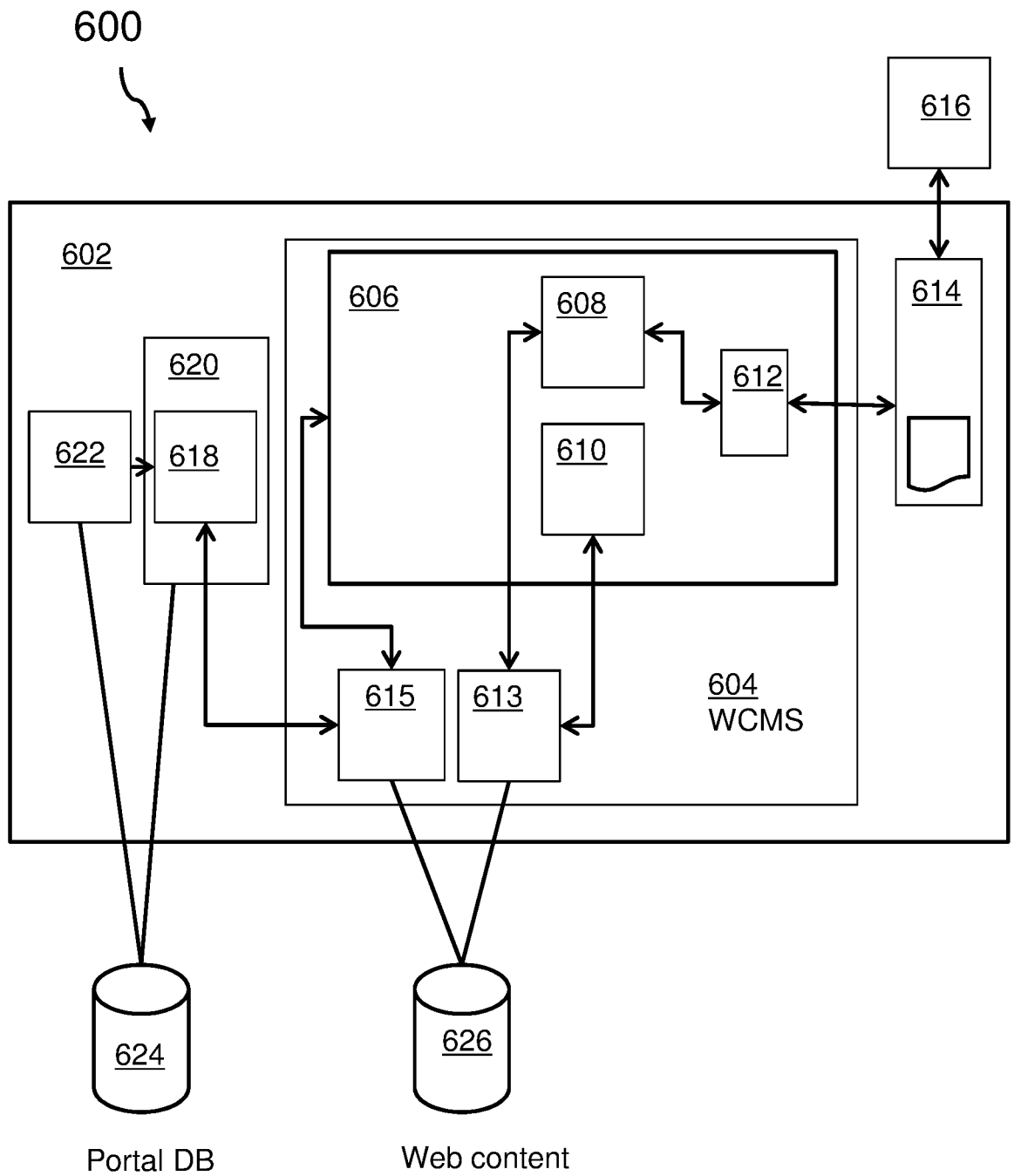
FIG. 6 shows an embodiment of a prior art portal system.

FIG. 6 shows an embodiment 600 of a prior art portal 602. A central WCMS 604 comprises a Web Content Rendering Engine 606. This comprises a SetQuery context tag 608 which is exchanged with a FeedDrivenObjects rendering extension module 612. In turn, this interacts with a FeedIntegrationService 614 which interacts with an external Web site 616.

On the other side, the SetQuery context tag 608 interacts with a FeedDriven ListPresentation 613, which also interacts with the Web content rendering engine 606, namely in form of an AttributeResource Tag 610. The Web Content Rendering Engine 606 receives as input the FeedDriven ListDefinition 615. Both, the FeedDriven ListPresentation 613 and the FeedDriven ListDefinition 615 may be stored in the Web content database 626.

The FeedDriven ListDefinition 615 is interchanged with the WCMS portlet 618 of the portlet model 620 which received input from the page model 622. Both, the portlet mode 620 and the page model 622 are stored in the portal database 624.

The generic Web content (viewer) portlet 618 may be known from prior art. It is capable of rendering a given content item, by passing the reference to the content item to the Web Content Management rendering engine 606 and returning the received markup back to the portal page model for page rendering.

The Web content rendering engine 606 may also be known from prior art. It is capable of transforming a given content item into markup data that can be rendered by a client system. Typically, the generated markup data is HTML based that gets rendered in the generic Web content viewer portlet 618. The rendering engine 606 resolves Web content manager tags that may be contained in the rendered Web content. Those tags may be used to include other managed Web components or to call custom code on the hosting server.

FeedDriven ListDefinitions 615 and FeedDriven ListPresentations 613 may also be known from prior art.

A SetQuery context tag 608 may be added to the presentation component rendering a list definition. This tag may extract the values from the form fields of the given list definition content item and may build an abstract mapped object query from those values. This query may then be forwarded to the list rendering service identifying the ID (identification) of the list rendering profile to be used for querying data as well as the URI to the remote data source.

The Web content management tag "AttributeResourceTag" 610 may be used to extract individual meta-data from the individual objects returned by a social object integration service. A simple syntax for this tag may look like this: [Plugin:AttributeResource attributeName="<name-of-meta-data-to-extract>"].

A plug-in named "FeedDrivenObjects RenderingExtension" 612 may get triggered by the Web Content rendering engine 606 when rendering content items. The plug-in implementation may look for the request parameter attached by the SetQuery context (Web content management) tag 608. If no such parameter is set, the plug-in 612 performs no operation. If such parameter is associated to the current request object, the plug-in 612 may take the abstract query object built by the SetQuery context tag 608, and passes it on to a Feed Integration Service 614 to get back a collection of software objects matching the given FeedDriven ListDefinition 612.

Figure 7:
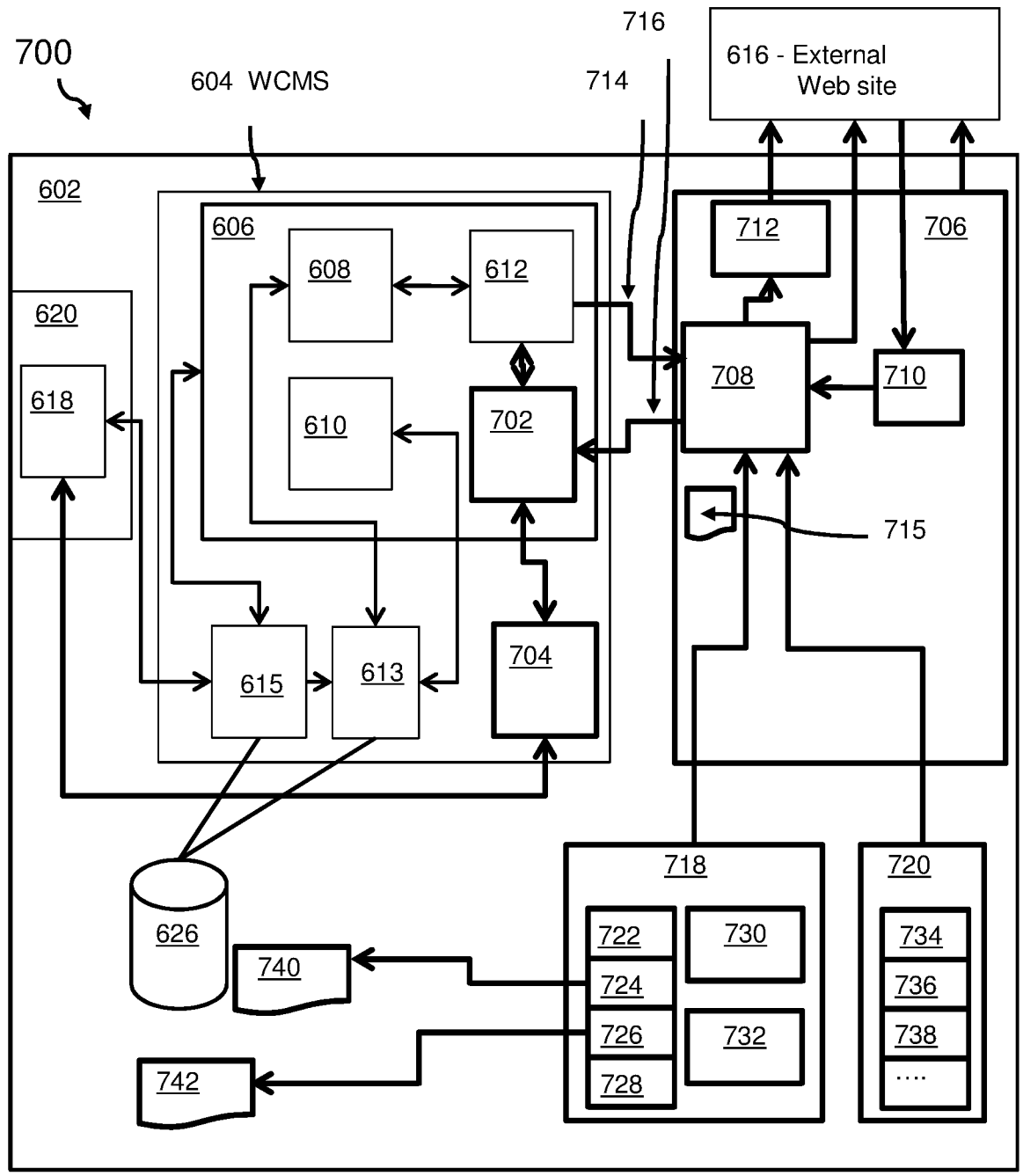
FIG. 7 shows an embodiment of the inventive portal system.

FIG. 7 shows an embodiment 700 of the inventive portal system. Elements that are equivalent to the elements of FIG. 6 are illustrated in normal lines and characters; elements that are newly introduced in the portal system 700 are highlighted by bold characters and bold lines. It may be noted that a differentiation is made between a prior art portal 602 and the inventive portal system 700.

In addition to the prior art portal system the Web content rendering engine 606 is enhanced by a SetWrite context tag 702. The WCMS 604 is enhanced by an Interaction Component 704. Lines between the modules show data flows and/or data exchanges. The interaction component 704 is also linked to the WCMS portlet 618.

Additional new elements and modules comprise a MappedObjectIntegrationSvc 706, a MappedObjectProfileManager 718 and a ProfileHandlerRegistry 720.

The MappedObjectIntegration service 706 is in data exchange with the FeedDrivenObjects rendering extension module 612. Outgoing data pass the ProfileID DataSource URL Transformer 714 and incoming data 716 comprise the ManagedObjectList 716, i.e., the intermediate data structure. Both go into or leave the profile handler 708. To generate the ManagedObjectList 716, a profile 715 or ListRenderingProfile 715 (see FIG. 2) is used. This is provided by the MappedObjectProfileManager 718. It comprises a ProfileProviderRegistry 722 which in turn comprises WCMS ProfileProvider data 724, ConfigProfileProvider data 726, and other ProfileProvider data 728. Additionally, the MappedObjectProfileManager 718 comprises a ProfileInheritanceAnalyzer 730 and a ProfileAssociationAnalyser 732.

The profile handler 708 is also linked to the ProfileHandlerRegistry 720 which may comprise an XML ProfileHandler 734, a JSON ProfileHandler 736, a CSV ProfileHandler 738, and other types of profile handlers.

Thus, the profile handler 708 may perform the transformation in both directions; i.e., inbound (i.e., first transformation) as well as out-bound (second transformation).

The WCMProfileProvider may access the profile 740—which may be identical to the profile 715—from the Web content database 626. The ConfigProfileProvider module 726 may access PortalConfiguration data 742.

Last but not least, a WriteTransformer 712, a ReaderTransformer 710, the PortalHandler 708 and the MappedObjectIntegrationSvc 706 are in data exchange with the external Web site 616. The received data structure, i.e., from the external Web page comes in via the line between the external Web site 616 and the ReaderTransformer 710. Data from the portal, i.e., the data structure leaves the portal system via the line between the WriteTransformer 712 and the external Web page 616.

Some of the above-described elements and modules introduced in the context of FIG. 7 may now be described in a more functional detail:

A MappedObjectIntegrationSvc 706 may load necessary artifacts for information processing as well as passing on requests to the remote services of the external Web page 616.

Various artifacts named ListRenderingProfiles 715 may define the mapping of the data structures that may be served by third party services (i.e., by the external Web site 616) to the names of attributes that may be consumed by site designers in order to assemble a nice user experience. Such a READ mapping may also be used by CREATE and UPDATE operations, where it may be used in the different direction. A form may specify that the parameter 'customerContact' is to be changed. As a consequence, said mapping will be read from this profile in order to identify the location where the new information fragment has to reside within the data structure.

A ListRenderingProfileManager 718 may take care of registration, parsing and validity checking of all ListRenderingProfiles 715 that may be brought into the portal system 700 from various potential ProfileProviders which may be registered in the portal system 700 via a pluggable architecture. Among the latter may be a WCMProfileProvider 724 allowing profile 715 definitions to be managed within the WCMS 604.

On startup, this component may analyze and handle interdependency between profile 715 definitions such as inheritance via a ProfileInheritenceAnalyzer 730 and a ProfileAssociationAnalyzer 732. Furthermore, it may analyze newly provided profiles 715 that are, for instance, defined within the WCMS 604 on the fly for immediate use by site designers.

A ProfileHandlerRegistry 720 may define a pluggable architecture for registering various profile handlers.

One or more profile handlers 734, 736, 738 may be brought into the portal system 700 via the aforementioned pluggable architecture. A profile handler of a certain type may be the entity that may be capable of processing the data retrieved from a remote service 616 together with the ListRenderingProfile 715 (or 740) that defines the mapping between the remote data, i.e., data structure, and the attributes that will be available in a MappedObjectList, i.e., intermediate data structure.

The result of this processing will be passed back into the FeedDrivenObjects rendering extension 612 and may contain a list of MappedObjects that may be rendered via design components such as a FeedDriven ListPresentation component 613.

As outlined before the ListRenderingProfile 715 (and/or 740) may be used as a two-way mapping for reading (READ case) as well as writing purposes (CREAT case, UPDATE case). One may have to differentiate between the READ, the DELETE, the UPDATE and the CREATE scenario.

For the DELETE case, the profile handler 708 may receive the URL to the MappedObjectList that is to be deleted from the remote system, i.e., external Web site 616. The identified object will be loaded, whereby a list of size 1 will be returned containing the object to be deleted. Using the mandatory identifying attribute, a DELETE request will be sent to the third party system 616 in order to delete the data from the backend system.

For the UPDATE case, the writer will receive the URL to the MappedObjectList that is to be updated within the remote system. The identified object will be loaded from the remote site, whereby a list of size 1 will be returned containing the MappedObjectList data structure to be updated in the third party system. Furthermore, it receives the data that is to be changed in the remote object, for instance the keys 'authorEmail' or 'authorPhoneNumber' along with the desired new values. These keys correspond to the keys that are defined in the ListRenderingProfile 715 (or 740).

The information in said profile 715, 740 may now be used to update the initial data structure received from the external Web site 616 system. That means that the mapping into the intermediate data structure will be read using the ListRenderingProfile 715, e.g., for the key 'authorEmail'. Given this is an XML data structure, the mapping may comprise an Xpath into the XML document which may point to the location where the updated data is to be replaced.

Following the RESTfull update pattern (REST=Representational State Transfer) that is widely used, the UPDATE request will be sent to the third party system passing along the updated data structure.

For the CREATE case, the writer may receive the data that is to be passed to the newly created remote object, for instance the keys 'authorName' or 'authorEmail' along with the desired new values. These keys correspond to the keys that are defined in the ListRenderingProfile 715. The information of which data is mandatory may be defined in the ListRenderingProfile 715 using meta-data information. Thus, the profile handler 708 "knows" the set of mandatory keys to be provided to the third party service 616.

The profile handler 708 may load a skeleton object (not shown) which may represent an empty data structure of the remote system and may be used in order to create new entities in the remote system.

Said skeleton object may be received (a) by querying a data structure of an arbitrary object from the third party system (i.e., external Web page 616) and processing this data is a way that all information fragments received for which NO new values are provided to the writer will be stripped off the data structure. Or it may be received by (b) a predefined skeleton fragment that may be laid down in the WCMS 604.

The empty skeleton data structure at hand may be filled via the mapping definitions similarly to the UPDATE case. As in the UPDATE case, the information in the loaded profile will now be used to write the desired values into the initial data structure which is actually an update on the skeleton data structure loaded for the target system.

This means that the mapping into the data structure will be read from the ListRenderingProfile 715, e.g., for the key 'authorEmail'. Given this is an XML data structure, the mapping may contain an Xpath into the XML document which points to the location where the updated data is to be replaced.

Following a RESTfull CREATE pattern that is widely used, the update request will be sent to the third party system passing along the updated data structure.

A WriteTransformer 712 and a ReadTransformer 710 which may optionally be invoked in case certain transformations are necessary after reading data from the remote system, i.e., the external Web page 616, and before passing it on to the profile handler 708 for the read scenario. Or they may be required after processing the information to be written in the profile handler 708 but before passing it on to the remote system for the create, update and delete scenario.

An InteractionComponent 704 may define the look and feel of interaction controls for the update and create scenarios—typically, the look and feel of form data to be filled and submitted to the MappedObjectIntegrationSvc 706.

A SetWriteContextWeb Content Management tag 702 may establish the query context for getting data from the external Web site 616.

Figure 8:
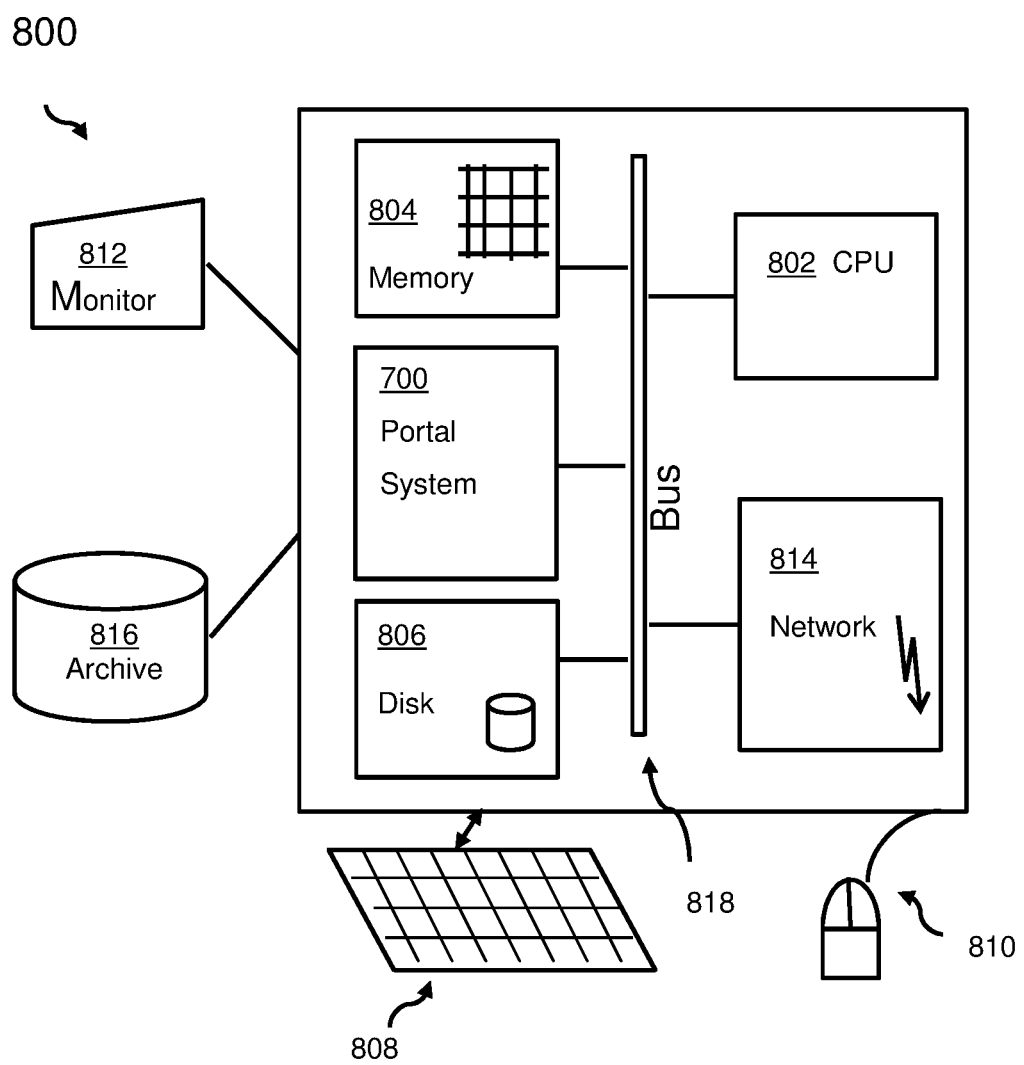
FIG. 8 shows a computer system comprising the inventive portal system.

Embodiments of the invention may be implemented together with virtually any type of computer, regardless of the platform being suitable for storing and/or executing program code. For example, as shown in FIG. 8, a computing system 800 may include one or more processor(s) 802 with one or more cores per processor, associated memory elements 804, an internal storage device 806 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 804 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 816 for an execution. Elements inside the computer 800 may be linked together by means of a bus system 818 with corresponding adapters. Additionally, a portal system 700 for integrating a plurality of third party service interactions into a portal 602 may be attached to the bus system 818.

The computing system 800 may also include input means, such as a keyboard 808, a pointing device such as a mouse 810, or a microphone (not shown). Alternatively, the computing system may be equipped with a touch sensitive screen as main input device. Furthermore, the computer 800, may include output means, such as a monitor or screen 812 [e.g., a liquid crystal display (LCD), a plasma display, a light emitting diode display (LED), or cathode ray tube (CRT) monitor]. The computer system 800 may be connected to a network (e.g., a local area network (LAN), a wide area network (WAN), such as the Internet or any other similar type of network, including wireless networks via a network interface connection 814. This may allow a coupling to other computer systems or a storage network or a tape drive. Those, skilled in the art will appreciate that many different types of computer systems exist, and the aforementioned input and output means may take other forms. Generally speaking, the computer system 800 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method comprising:
receiving a first data structure from a remote service, the remote service being an origin of the first data structure;
associating the first data structure with a selected user profile out of a plurality of user profiles that, based on a uniform resource locator of the origin of the first data structure, provide a basis for declarative mapping;
loading a new user profile from outside of a Web portal, wherein the Web portal comprises a profile inheritance analyzer adapted for analyzing the new user profile loadable from outside the portal for a reuse of an already defined declarative mapping on the selected user profile which already is stored in a profile provider registry or a profile handler repository, the already defined declarative mapping determined from the new user profile;
transforming content of the first data structure, using a declarative mapping associated with the selected user profile, into an intermediate data structure, wherein the declarative mapping maps information items in the first data structure to information items in the intermediate data structure, wherein the information items in the intermediate data structure have defined attribute names enumerated in the selected user profile;
providing the intermediate data structure to a presentation layer of the Web portal;
triggering a signal causing a rendering of the intermediate data structure via a portlet of the Web portal to a display;
transforming captured input from the portlet from the intermediate data structure to the first data structure using the declarative mapping associated with the selected user profile; and
sending the first data structure to the remote service.

2. The method according to claim 1, wherein the captured input is used to modify the content of the first data structure via the intermediate data structure with captured input from the portlet.

3. The method according to claim 1, wherein the selected user profile is based on XML or JSON syntax.

4. The method according to claim 1, wherein the transforming content of the first data structure is based on mapping a data field of the first data structure to an Xpath statement of the declarative mapping which points to a location within the intermediate data structure to where the content of the data field of the first data structure has to be loaded.

5. The method according to claim 1, wherein the Web portal comprises a profile association analyzer adapted to generate an associated declarative mapping in cases where the first data structure is missing data elements.

6. A computing system comprising:
a processor programmed to initiate executable operations comprising:
receiving a data structure from a remote service, the remote service being an origin of the first data structure;
associating the first data structure with a selected user profile out of a plurality of user profiles that, based on a uniform resource locator of the origin of the first data structure, provide a basis for declarative mapping;
loading a new user profile from outside of a Web portal, wherein the Web portal comprises a profile inheritance analyzer adapted for analyzing the new user profile loadable from outside the portal for a reuse of an already defined declarative mapping on the selected user profile which already is stored in a profile provider registry or a profile handler repository, the already defined declarative mapping determined from the new user profile;
transforming content of the first data structure, using a declarative mapping associated with the selected user profile, into an intermediate data structure, wherein the declarative mapping maps information items in the first data structure to information items in the intermediate data structure, wherein the information items in the intermediate data structure have defined attribute names enumerated in the selected user profile;
providing the intermediate data structure to a presentation layer of the Web portal;
triggering a signal causing a rendering of the intermediate data structure via a portlet of the Web portal to a display;
transforming captured input from the portlet from the intermediate data structure to the first data structure using the declarative mapping associated with the selected user profile; and
sending the first data structure to the remote service.

7. The computing system according to claim 6, wherein the captured input is used to modify the content of the first data structure via the intermediate data structure with captured input from the portlet.

8. The computing system according to claim 6, wherein the selected user profile is based on XML, or JSON syntax.

9. The computing system according to claim 6, wherein the transforming content of the first data structure is based on mapping a data field of the first data structure to an Xpath statement of the declarative mapping which points to a location within the intermediate data structure to where the content of the data field of the first data structure has to be loaded.

10. The computing system according to claim 6, wherein the Web portal comprises a profile association analyzer adapted to generate an associated declarative mapping in cases where the first data structure is missing data elements.

11. A computer program product comprising a computer readable storage medium having program code stored thereon, wherein the computer readable storage medium is not a transitory, propagating signal per se, the program code executable by a processor to perform a method comprising:
receiving a first data structure from a remote service, the remote service being an origin of the first data structure;
associating the first data structure with a selected user profile out of a plurality of user profiles that, based on a uniform resource locator of the origin of the first data structure, provide a basis for declarative mapping;
loading a new user profile from outside of a Web portal, wherein the Web portal comprises a profile inheritance analyzer adapted for analyzing the new user profile loadable from outside the portal for a reuse of an already defined declarative mapping on the selected user profile which already is stored in a profile provider registry or a profile handler repository, the already defined declarative mapping determined from the new user profile;
transforming content of the first data structure, using a declarative mapping associated with the selected user profile, into an intermediate data structure, wherein the declarative mapping maps information items in the first data structure to information items in the intermediate data structure, wherein the information items in the intermediate data structure have defined attribute names enumerated in the selected user profile;

providing the intermediate data structure to a presentation layer of the Web portal;

triggering a signal causing a rendering of the intermediate data structure via a portlet of the Web portal to a display;

transforming captured input from the portlet from the intermediate data structure to the first data structure using the declarative mapping associated with the selected user profile; and sending the first data structure to the remote service.

12. The computer program product according to claim 11, wherein the captured input is used to modify the content of the first data structure via the intermediate data structure with captured input from the portlet.

13. The computer program product according to claim 11, wherein the selected user profile is based on XML or JSON syntax.

14. The computer program product according to claim 11, wherein the transforming content of the first data structure is based on mapping a data field of the first data structure to an Xpath statement of the declarative mapping which points to a location within the intermediate data structure to where the content of the data field of the first data structure has to be loaded.

15. The computer program product according to claim 11, wherein the Web portal comprises a profile association analyzer adapted to generate an associated declarative mapping in cases where the first data structure is missing data elements.

* * * * *